(12) United States Patent
Renault

(10) Patent No.: US 7,127,946 B2
(45) Date of Patent: Oct. 31, 2006

(54) METHOD FOR IMPLEMENTING A RESONATOR UNDER ELECTROSTATIC FORCES

(75) Inventor: Alain Renault, Pontoise (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 11/312,426

(22) Filed: Dec. 21, 2005

(65) Prior Publication Data

US 2006/0096375 A1 May 11, 2006

Related U.S. Application Data

(62) Division of application No. 10/768,164, filed on Feb. 2, 2004, now Pat. No. 7,010,977.

(30) Foreign Application Priority Data

Feb. 6, 2003 (FR) .................................. 03 01383

(51) Int. Cl.
*G01C 19/00* (2006.01)
*G01P 9/04* (2006.01)
(52) U.S. Cl. .................................. 73/504.13
(58) Field of Classification Search ............. 73/504.12, 73/504.13, 1.77, 504.02
See application file for complete search history.

(56) References Cited

U.S. PATENT DOCUMENTS

| 4,079,630 | A | 3/1978 | Friedland et al. |
| 4,951,508 | A | 8/1990 | Loper et al. |
| 5,616,864 | A | 4/1997 | Johnson et al. |
| 5,652,374 | A | 7/1997 | Chia et al. |
| 5,760,304 | A | 6/1998 | Lynch |
| 5,850,041 | A | 12/1998 | Kumar et al. |
| 6,158,282 | A | 12/2000 | Matthews et al. |
| 6,427,518 | B1 | 8/2002 | Miekley et al. |
| 6,651,499 | B1 | 11/2003 | Fell et al. |
| 6,805,007 | B1 | 10/2004 | Fell et al. |

FOREIGN PATENT DOCUMENTS

| EP | 0 810 418 | 12/1997 |
| FR | 2 755 227 | 4/1998 |

*Primary Examiner*—Hezron Williams
*Assistant Examiner*—John C Hanley
(74) *Attorney, Agent, or Firm*—Young & Thompson

(57) ABSTRACT

In an implementation in rate gyro mode, the method includes exciting the vibrating member with a combination of control signals including an amplitude control signal at a frequency twice the resonant frequency, and a quadrature control signal at DC. In free gyro mode, the method includes the steps of applying a combination of signals to common electrodes 5 and of applying the combination in alternation to main electrodes 5.1 and 5.2 and to auxiliary electrodes 7.1 and 7.2 interleaved between the main electrodes.

3 Claims, 1 Drawing Sheet

METHOD FOR IMPLEMENTING A RESONATOR UNDER ELECTROSTATIC FORCES

This application is a division of application Ser. No. 10/768,164, filed on Feb. 2, 2004, now U.S. Pat. No. 7,010,977 the entire contents of which are hereby incorporated by reference.

The present invention relates to a method of implementing an electrostatic resonator for use as an inertial rotation sensor.

BACKGROUND OF THE INVENTION

Electrostatic resonators are known, in particular from documents EP-A-0 810 418 or FR-A-2 792 722, comprising a vibrating member in the form of a metallized bell adapted to be set into vibration at a resonant frequency under the effect of electrostatic forces generated by electrodes disposed facing a portion of the vibrating member.

The resonator is adapted to operate in rate gyro mode or in free gyro mode. In rate gyro mode, the vibrating member is excited by means of a combination of control signals applied at the resonant frequency of the vibrating member and modulated to generate an amplitude control signal, a precession control signal, and a quadrature control signal, these control signals being applied in such a manner that measuring the vibration of the vibrating member and demodulating said vibration at the resonant frequency of the vibrating member enable the speed of rotation to which the resonator is being subjected to be determined by making use of appropriate equations.

The accuracy with which the speed of rotation is calculated is naturally a function of the accuracy with which the various terms of the equation giving the speed of rotation to be measured are themselves determined. One of these terms is the amplitude of the vibration obtained by applying amplitude control. It is this term which is known with the least accuracy and stability. Furthermore, quadrature control is applied in the same directions as precession control, and when the quadrature control and the precession control are both applied in the form of a signal modulated at the resonant frequency, any phase error in implementing quadrature control becomes projected onto precession control and gives rise to resonator drift error.

The same problems arise when the resonator is used in free gyro mode, i.e. when the vibrating member is excited by means of a combination of control signals comprising only an amplitude control signal and a quadrature control signal.

It is also known from document U.S. Pat. No. 5,850,041 to control a resonator in free gyro mode by applying the amplitude control at twice the resonant frequency and by applying quadrature control in the form of a DC voltage. However, according to that document, quadrature control is applied separately from amplitude control over a very large number of separate electrodes, i.e. sixteen or even thirty-two separate electrodes. The resonator is thus itself extremely expensive to make, not only because of the difficulty of making a large number of electrodes accurately, but also because of the difficulty of making connections between all of those electrodes and an external processor. In addition, the associated control circuit is very complex and thus also very expensive.

OBJECT OF THE INVENTION

An object of the invention is to provide a method of implementing an electrostatic vibrating resonator operating with great accuracy, preferably while using a small number of electrodes and connections to said electrodes.

BRIEF DESCRIPTION OF THE INVENTION

In a first aspect, the invention provides a method of implementing a resonator in rate gyro mode, the resonator comprising a vibrating member adapted to be set into vibration at a resonant frequency under the effect of electrostatic forces generated by electrodes placed facing a portion of the vibrating member, the method comprising the steps of exciting the vibrating member by means of a combination of control signals comprising an amplitude control signal, a precession control signal, and an amplitude-modulated quadrature control signal, of measuring vibration of the vibrating member, and of demodulating the vibration at the resonant frequency of the vibrating member, the precession control signal being applied at a frequency that is twice the resonant frequency. Thus, cross-modulation occurs between the precession signal and variation in the airgaps facing the control electrodes, such that by converting double argument trigonometric formulae present in the terms that result from excitation at double frequency into single argument trigonometric formulae, and by eliminating terms of negligible value that result from this calculation, and equation is obtained in which the terms which include the amplitude of the vibration are eliminated. Vibration amplitude thus has no influence on calculating speed of rotation. The accuracy with which the speed of rotation of the resonator is determined in thus increased.

In an advantageous implementation in rate gyro mode and in which a basic implementation in free gyro mode for which the precession control signal is eliminated, the amplitude control signal is applied at a frequency twice the resonant frequency during a stage of sustaining the vibration of the vibrating member. Thus, in both cases, equations giving the speed of rotation of the resonator are simplified so that the electronics for controlling and determining the speed of rotation of the resonator can be simplified while still enabling the required accuracy to be obtained.

In a second aspect of the invention, the quadrature control signal is applied in the form of a DC signal to electrodes that are common with the electrode control signal. Thus, any phase error relative to precession control or any orientation error in the amplitude control is eliminated while minimizing the number of electrodes needed for implementation. In this implementation, the electrostatic forces resulting from quadrature control are the consequence of cross-modulation that result from variation in the airgaps facing the electrodes. In order to maximize this airgap variation, the amplitude control signal is preferably applied in such a manner that the vibration of the vibrating member is oriented so that a vibration node is in register with a gap between two electrodes. The portion of the vibrating member in register with an electrode is then subjected to non-zero airgap variation which makes it possible to obtain strong cross-modulation and consequently better measurement accuracy.

In yet another aspect of the invention associated with the resonator being implemented in free gyro mode, the amplitude control at a frequency double the resonant frequency is applied to the vibrating member itself, and the quadrature control is applied to electrodes which serve simultaneously for detection. This achieves an increased dynamic range, thereby improving measurement accuracy with a minimum number of connections.

BRIEF DESCRIPTION OF THE DRAWING

Other characteristics and advantages of the invention appear on reading the following description of a method of implementing a vibrating hemispherical resonator given with reference to the accompanying figures, in which.

DETAILED DESCRIPTION OF THE INVENTION

Figure 1:
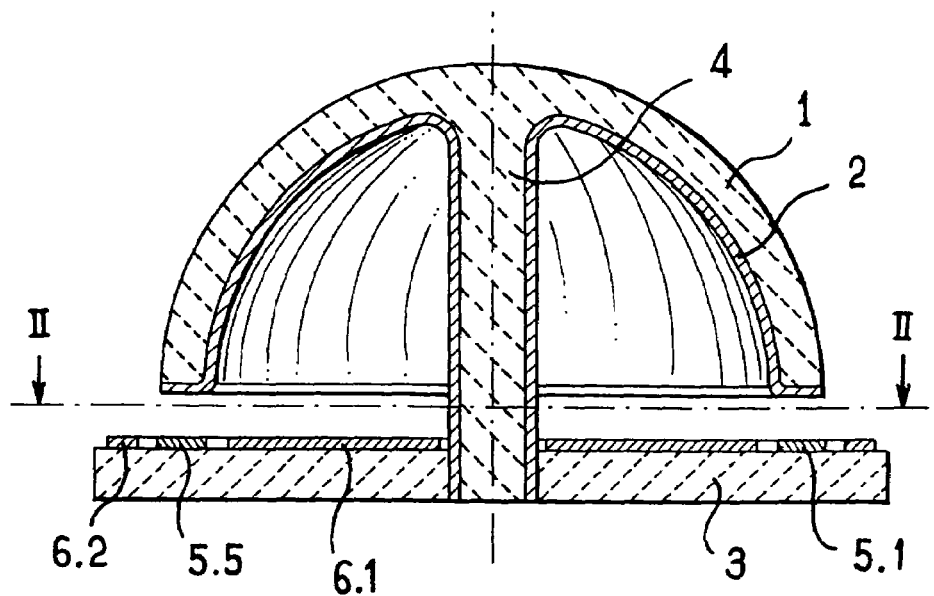
FIG. 1 is an axial section view on line I—I of FIG. 2.

For a better understanding of the invention, the resonator is shown on a greatly enlarged scale with the thicknesses of the electrodes and the airgaps being exaggerated.

In the embodiment shown, the resonator comprises in conventional manner a hemispherical vibrating member 1, e.g. a bell made of silica and fixed by a rod 4 to a base 3. The inside surface of the bell 1 and its edge and also the rod 4 are covered in a layer of metal 2. The base 3 carries main electrodes given overall numerical reference 5 and individual references 5.1, 5.2, . . . , 5.8 enabling them to be identified individually. The electrodes 5 extend facing the edge of the vibrating member 1.

In the embodiment shown, the resonator also has a shield electrode given overall reference 6, which electrode is subdivided into two portions 6.1 and 6.2 each comprising four auxiliary electrodes given overall numerical reference 7 and particular numerical references 7.1 for the auxiliary electrodes of the portion 6.1 and 7.2 for the auxiliary electrodes of the portion 6.2. The auxiliary electrodes 7.1 and 7.2 extend in alternation between the main electrodes 5. The portion 6.1 of the shield electrode is constituted by a central disk from which the auxiliary electrodes 7.1 extend radially outwards, while the portion 6.2 of the shield electrodes is constituted by a circular ring extending around the main electrodes 5 and from which the auxiliary electrodes 7.2 extend radially inwards.

In order to implement rate gyro mode, and in the preferred implementation, the vibrating member is initially set into vibration by applying an amplitude control signal CA. The vibrating member 1 cannot be set into vibration by means of a signal at twice its resonant frequency. While it is being set into vibration, the amplitude control signal is thus applied at the resonant frequency. Preferably, the amplitude control signal is applied so that vibration of the vibrating member is oriented in such a manner that a vibration node is in register with a gap between two electrodes. For this purpose, the amplitude control signal CA is applied modally in quadrature to at least two electrodes. In the embodiment shown which operates in mode 2, the amplitude control signal CA is applied in phase to at least two electrodes that are at 45° to each other, e.g. to the electrodes 5.1 and 5.2. The resulting vibration then presents an antinode in register with the gap between the electrodes 5.1 and 5.2 as represented by a bold double-headed arrow in the figure. Corresponding antinodes appear in the gaps between the electrodes 5.3 & 5.4, 5.5 & 5.6, and 5.7 & 5.8. Simultaneously, nodes are formed in the gaps between electrodes 5.2 & 5.3, 5.4 & 5.5, 5.6 & 5.7, and 5.8 & 5.1, as represented by small bold circles in FIG. 2. To increase the speed at which vibration is established, diametrically opposite electrodes, i.e. electrodes 5.2 and 5.6 in the above-described example are also fed with the same amplitude control signal. The vibration oriented in this way thus has non-zero amplitude in register with each main electrode 5.

The same vibration position can also be obtained by feeding the electrode 5.2 or the electrodes 5.2 and 5.6 with a signal CA, and the electrode 5.3 or the electrodes 5.3 and 5.7 with a signal −CA (i.e. in phase opposition).

Figure 2:
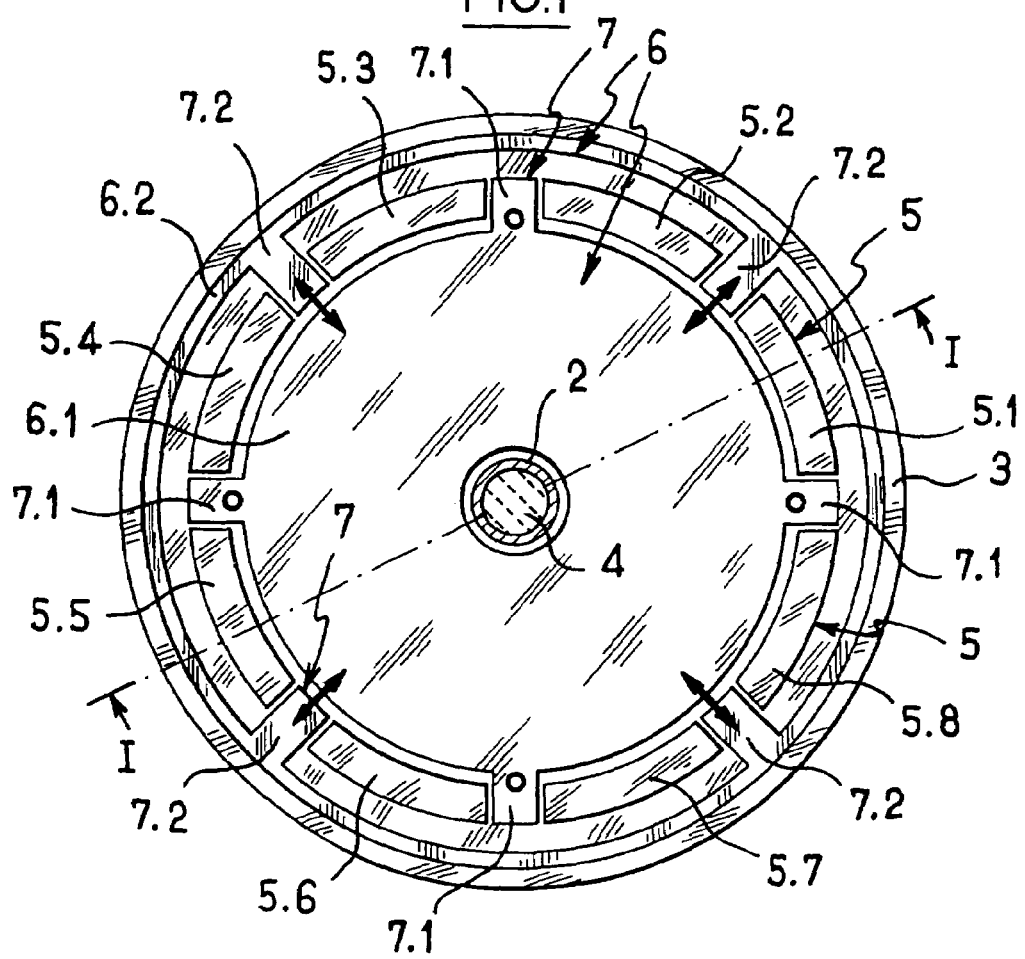
FIG. 2 is a plan view of the electrodes of the resonator which is shown in section on line II—II of FIG. 1.

In applications where control is performed in alternation with detection by time division multiplexing of control and detection, the speed of setting into vibration can also be increased by powering all eight main electrodes 5 simultaneously. For a vibration position as shown in FIG. 2, the electrodes 5.1, 5.2, 5.5, and 5.6 are fed in this case with a signal CA while the electrodes 5.3, 5.4, 5.7, and 5.8 are fed with a signal −CA.

In a preferred implementation, after the stage of setting into vibration, amplitude control is switched to a sustaining stage in which the amplitude control signal CA is applied at a frequency which is double the resonant frequency. The control signal can then be applied either to the main electrodes 5 or to the metallized layer 2 of the bell 1. At this frequency, variation in the airgap in register with the electrodes suffices to generate electrostatic forces that sustain vibration, even when the same control signal is applied to all of the main electrodes 5 or when a single amplitude control signal is applied to the bell.

After the stage of putting the resonator into vibration, precession control is applied to maintain the orientation of the vibration in spite of movements of the equipment on which the resonator is mounted. According to the invention, this precession control CP, of amplitude which is calculated in conventional manner, is applied at a frequency which is twice the resonant frequency to the control electrodes with appropriate sign for keeping vibration in a stable orientation.

In parallel, quadrature control CQ is preferably applied in accordance with the invention as a DC signal of amplitude calculated in conventional manner for canceling resonator drift. As for precession control, quadrature control is applied appropriately as a function of which electrodes are used for applying this control.

By way of example, when the sustaining amplitude control signal is applied at the frequency which is twice the resonant frequency, a signal CA−CP−CQ is applied to electrode 5.1 while a signal CA+CP+CQ is applied to the electrode 5.2 As before, the speed of response can be increased by applying the same signals respectively to electrodes 5.5 and 5.6. When using eight electrodes, the signal CA−CP−CQ is applied to the electrodes 5.1, 5.3, 5.5, and 5.7, while the signal CA+CP+CQ is applied simultaneously to the electrodes 5.2, 5.4, 5.6, and 5.8. When the amplitude control signal CA is applied to the bell, this component is eliminated from the signals applied to the control electrodes.

When implemented in rate gyro mode, the two portions 6.1 and 6.2 of the shield electrode are connected to ground so as to perform the usual function of reducing cross-talk between electrodes.

When only four electrodes are used for applying control signals, the other electrodes are available for detecting the modified vibration in order to calculate precession control and the speed of rotation of the resonator. A single electrode may be used for such reception. Nevertheless, for a better dynamic range, at least two electrodes and preferably four electrodes are used for reception.

In the example described above where the control signals are applied to the electrodes 5.1, 5.2, 5.5, and 5.6, the signal detected on the electrode 5.3 is designated D5.3, the signal detected on the electrode 5.4 is designated D5.4, . . . , and vibration amplitude can be measured by any one of the combinations D5.3+D5.4, D5.3+D5.7, D5.4+D5.8, D5.3+D5.8, D5.4+D5.7, or indeed D5.3+D5.4+D5.7+D5.8. When using multiplexing to alternate control and detection, amplitude measurement can be performed on all eight electrodes 5 by the combination D5.1+D5.2+D5.5+D5.6−D5.3−D5.4−D5.7−D5.8. Servo-control error can be measured by any one of the following combinations: D5.3−D5.4, D5.3−D5.8, D5.7−D5.4, or D5.3−D5.4+D5.7−D5.8.

In an application in free gyro mode, precession control is eliminated but the resonator may otherwise be implemented in the same manner as in rate gyro mode. Nevertheless, when implementing free gyro mode, the orientation of vibration is no longer fixed and is a function of the movements to which the resonator is subjected. In particular, the positions of the nodes vary as a function of the movement of the resonator such that at certain instants, the position of a node will coincide with the center of an electrode, and when using a DC quadrature control signal, this signal is no longer subjected to cross-modulation because there is no variation of airgap. In another aspect of the invention, the shield electrode is used to apply the quadrature control to electrodes which are not in register with a vibration node.

To describe this implementation, the starting situation is that in which the main electrodes used are the electrodes 5.1, 5.2, 5.5, and 5.6. While sustaining vibration and in the absence of any movement of the resonator, the signal CA−CQ is applied to the electrodes 5.1 and 5.5 while the signal CA+CQ is applied to the electrodes 5.2 and 5.6. Assuming that the resonator is subjected to movement causing the vibration to turn clockwise, then the node which was initially between the electrodes 5.2 and 5.3 moves until this node comes close to the middle of the electrode 5.2. In this situation, the quadrature control applied to the electrode 5.2 ceases to effective. In order to avoid this loss of effectiveness, the signal CA−CQ is switched to the portion 6.1 of the shield electrode and the signal CA+CQ to the portion 6.2 of the shield electrode. The node which is in register with the electrode 5.2 is then halfway between the electrodes 7.1 and 7.2 which are subjected respectively to the signals CA−CA and CA=CQ. The airgap in register with the electrodes 7.1 and 7.2 is thus varying so that quadrature control is subjected to cross-modulation. Quadrature control is thus again fully effective. The control signals are thus applied in alternation to the main electrodes 5 and to the auxiliary electrodes 7 as vibration turns so as to keep the vibration nodes between the electrodes to which the quadrature control signal is applied. In this context, it should be observed that in order to switch over the control signals from one group of electrodes to the other, it suffices to bring the amplitude of the control signal on the inactive electrodes to zero without it being necessary to switch the control signal from one group of electrodes to the other. The method can thus be used in space where it is not possible to use electronic switches.

As explained above, increasing the number of electrodes to which the control signals are applied makes it possible to increase the dynamic range and thus the accuracy of operation. In addition, in resonators used in space, it is not possible to perform switching of the electrodes between a control function and a detection function. For implementation in space it is therefore usually necessary to allocate half of the main electrodes to control and the other half to detection.

In a preferred implementation of the invention in free gyro mode, it is nevertheless possible to allocate the same electrodes both to control and to detection.

In this implementation, during the stage of sustaining vibration, the amplitude control signal is applied to the bell at a frequency twice the resonant frequency. The DC quadrature control signal −CQ is applied to the main electrodes 5.1, 5.3, 5.5, and 5.7 while the DC quadrature control signal CQ is applied to the main electrodes 5.2, 5.4, 5.6, and 5.8.

Simultaneously, each of the main and auxiliary electrodes is connected to a detector member which, in conventional manner, is a charge amplifier, i.e. an operational amplifier including a capacitor connected between the inverting input which is connected to an electrode of the resonator and the output of the amplifier. Furthermore, the quadrature control signal is applied to the non-inverting input and is added to the detection signal. Since the quadrature control signal is a known DC voltage, it is easy to subtract this signal in order to obtain the detection signal alone. In this respect, it should be observed that two diametrically opposite electrodes may be connected in parallel to the same charge amplifier.

While the vibration is turning, quadrature control is applied alternately to the main electrodes and to the auxiliary electrodes as described above. With this implementation of the invention it suffices to have eleven connections (the bell, the eight main electrodes, and the two portions of the shield electrode) in order to be able to apply the control signal to eight electrodes and to pick up the detection signal on eight electrodes.

On this subject, in yet another aspect of the invention, it is possible to calibrate the gain of the detectors so that it is the same on two paths in quadrature. Vibration is analyzed at a frequency which is twice the resonant frequency for electrodes that are modally in quadrature when a vibration node is in register therewith. This calibration can be performed either during an initialization stage by applying a precession control signal to place a vibration node successively in register with each of the electrodes, or by performing calibration measurement each time it is detected that vibration is in a position for which a vibration node is in register with an electrode. By way of example, during an initialization stage, vibration is initially oriented so that a vibration node is in register with the electrodes 5.2, 5.6, 5.4, and 5.8, the electrodes 5.2 and 5.6 being connected in parallel to a first charge amplifier having gain G1 while the electrodes 5.4 and 5.8 are connected to a second charge amplifier having gain G2. By demodulating the vibration at a frequency twice the resonant frequency, it is possible to determine the gains G1 and G2. The vibration is then turned so that a vibration node comes into register with the electrodes 5.1, 5.3, 5.5, and 5.7. In the same way as described above, the gains G3 and G4 are determined for the charge amplifiers associated with each electrode pair. Thereafter G1+G2 is compared with G3+G4, from which a coefficient k is deduced so that G1+G2=k (G3+G4). The coefficient k is then applied during demodulated detection at the resonant frequency. It should be observed that gain balancing is described above with reference to two groups of electrodes in quadrature each comprising four electrodes. It is also possible to equalize gain on two electrodes only, e.g. by measuring G1 on electrode 5.2 only and G3 on electrode 5.1 only and then determining the coefficient k so that G1=k G3.

Naturally, the invention is not limited to the implementations described and it may be subjected to variations that will appear to the person skilled in the art without going beyond the ambit of the invention as defined by the claims.

In particular, although the method of the invention is described above in association with an amplitude control signal at a frequency that is twice the resonant frequency during the sustaining stage, thereby simplifying equations in rate gyro mode since the precession signal is itself at a frequency that is twice the resonant frequency, it is possible to apply the amplitude control signal at the resonant frequency.

Similarly, in rate gyro mode, if it is desired to simplify calculation by accepting a small amount of drift, it is possible to apply quadrature control at the resonant frequency or at twice the resonant frequency.

Furthermore, applying a DC quadrature signal together with amplitude control at a frequency twice the resonant frequency tends to cause dynamic range to be lost. If it is desired to recover a large dynamic range while accepting a partial deterioration in stability, it is possible to apply quadrature control as a DC signal while applying amplitude control at the resonant frequency.

In the preferred implementation, amplitude control is applied so that the resulting vibration presents nodes between the electrodes, thus making it possible to obtain large variations of airgap in register with the electrodes and thus maximum cross-modulation between the airgap variations and the DC control signals or the control signals at a frequency twice the resonant frequency. The method of the invention can also be implemented with a smaller dynamic range by generating vibration in conventional manner so that the vibration presents nodes and antinodes in register with electrodes. This loss of dynamic range then needs to be compensated by more powerful control electronics and detection electronics.

Although the invention is described above with reference to a hemispherical resonator, the invention applies to any electrostatically controlled resonator.

What is claimed is:

1. A method of implementing a resonator in free gyro mode, the resonator comprising a vibrating member adapted to be set into vibration at a resonant frequency under the effect of electrostatic forces generated by electrodes disposed facing a portion of the vibrating member, the method comprising the steps of:

exciting the vibrating member by means of a combination of control signals comprising, during a sustaining stage, an amplitude control signal at a frequency twice the resonant frequency of the vibrating member, and a DC quadrature control signal, both control signals being amplitude-modulated;

measuring vibration of the vibrating member; and demodulating the vibration at the resonant frequency of the vibrating member, wherein the amplitude control signal and the quadrature control signal are applied to common electrodes that are modally in quadrature.

2. A method according to claim 1, wherein the amplitude control signal is applied to at least half of the electrodes that are distributed in symmetrical manner.

3. A method according to claim 1, wherein the quadrature control signal is applied to electrodes on either side of a vibration node.

* * * * *